United States Patent
Boudah et al.

(10) Patent No.: US 12,264,940 B2
(45) Date of Patent: Apr. 1, 2025

(54) METHOD AND APPARATUS FOR THE DOWNHOLE IN-SITU CALIBRATION OF ANGULAR RATE SENSORS AND MAGNETOMETERS

(71) Applicant: Sylvain Bedouet, Houston, TX (US)

(72) Inventors: Karim Boudah, Katy, TX (US); Sylvain Bedouet, Houston, TX (US)

(73) Assignee: OnTarget Drilling, LLC, Houston, TX (US)

( * ) Notice: Subject to any disclaimer, the term of this patent is extended or adjusted under 35 U.S.C. 154(b) by 0 days.

(21) Appl. No.: 18/134,553

(22) Filed: Apr. 13, 2023

(65) Prior Publication Data
US 2024/0344851 A1    Oct. 17, 2024

(51) Int. Cl.
*G01C 25/00* (2006.01)
*E21B 47/024* (2006.01)

(52) U.S. Cl.
CPC .......... *G01C 25/005* (2013.01); *E21B 47/024* (2013.01)

(58) Field of Classification Search
CPC .............................. G01C 25/005; E21B 47/024
See application file for complete search history.

(56) References Cited

U.S. PATENT DOCUMENTS

| | | | | |
|---|---|---|---|---|
| 5,297,028 A | * | 3/1994 | Ishikawa | G01P 1/006 73/497 |
| 2003/0183423 A1 | * | 10/2003 | Brazil | E21B 7/04 175/45 |
| 2009/0001986 A1 | * | 1/2009 | Besson | G01V 3/083 324/334 |
| 2012/0259579 A1 | * | 10/2012 | Blake | G01C 21/183 702/151 |
| 2012/0265468 A1 | * | 10/2012 | Dennis | G01V 13/00 73/1.01 |
| 2013/0018582 A1 | * | 1/2013 | Miller | G01C 17/38 701/501 |
| 2013/0315660 A1 | * | 11/2013 | Oishi | B23K 31/02 420/490 |
| 2014/0202229 A1 | * | 7/2014 | Stanley | G01C 25/005 73/1.79 |
| 2015/0027779 A1 | * | 1/2015 | Sugiura | E21B 47/024 175/45 |
| 2015/0345283 A1 | * | 12/2015 | Switzer | E21B 47/12 73/152.54 |
| 2018/0298743 A1 | * | 10/2018 | Sullivan | E21B 47/022 |

* cited by examiner

*Primary Examiner* — Steven A MacDonald
(74) *Attorney, Agent, or Firm* — Blair B. Suire

(57) ABSTRACT

A method for calibrating the sensors present within a drilling tool, whereby the calibration occurs downhole and in-situ within the drilling tool. The calibration method may use the rotation of the drilling tool which typically occurs during drilling operations, whereby the drilling tool is rotating along the axis which follows the drilling trajectory. Direction and speed of rotation of the drilling tool may contribute to the in-situ calibration of the sensors, which may include angular rate sensors, magnetometers, and accelerometers.

9 Claims, 3 Drawing Sheets

METHOD AND APPARATUS FOR THE DOWNHOLE IN-SITU CALIBRATION OF ANGULAR RATE SENSORS AND MAGNETOMETERS

BACKGROUND

This disclosure relates generally to methods and apparatus for enhanced drilling operation of a Rotary Steerable System, further referred to as RSS tool. This disclosure relates more particularly to methods and apparatus for the downhole in-situ calibration of an angular rate sensor and magnetometers, active inside an RSS, without the need to bring the RSS back to surface.

Angular rate sensors and magnetometers with their associated electronics are typical components included in a sensor section of a Bottom Hole Assembly, further referred to as BHA, dedicated to bottom hole directional drilling. The BHA may be used to drill downhole geological layers, in order to reach zones of interest including oil, gas, water, hydrocarbons or relevant mixtures. An angular rate sensor will usually be used in combination with magnetometers to control the rotation of internal components of the RSS independently of the rotation of the drill collar in order to steer the trajectory of the wellbore in the required direction. The measurements of sensors such as angular rate sensor, magnetometers and their associated electronics are typically drifting with time and exposure to temperature, shocks and vibrations. A periodic re-calibration of the sensors is then required, which is usually performed in a factory lab.

The proposed invention allows calibrating one or multiple angular rate sensors as well as one or multiple magnetometers, which are included in the sensor section of a drilling assembly, whereby the calibration may occur downhole, during regular drilling operation. This enables the use of sensors with relaxed specifications in terms of repeatability error and long-term drift error and eliminate the need for a factory lab recalibration. This may significantly reduce the cost of the sensors and their associated electronics and may eliminate the complex logistics of a recalibration in the factory lab at fixed time intervals.

The downhole calibration may have the advantage of being more accurate as it may include the actual downhole conditions such as the downhole temperature, surrounding the BHA while calibrating the angular rate sensor or the magnetometer.

BRIEF DESCRIPTION OF THE DRAWINGS

For a more detailed description of the embodiments of the disclosure, reference will now be made to the accompanying drawings.

DETAILED DESCRIPTION

It is to be understood that the following disclosure describes several exemplary embodiments for implementing different features, structures, or functions of the invention. Exemplary embodiments of components, arrangements, and configurations are described below to: simplify the disclosure; however, these exemplary embodiments are provided merely as examples and are not intended to limit the scope of the invention.

Figure 1:
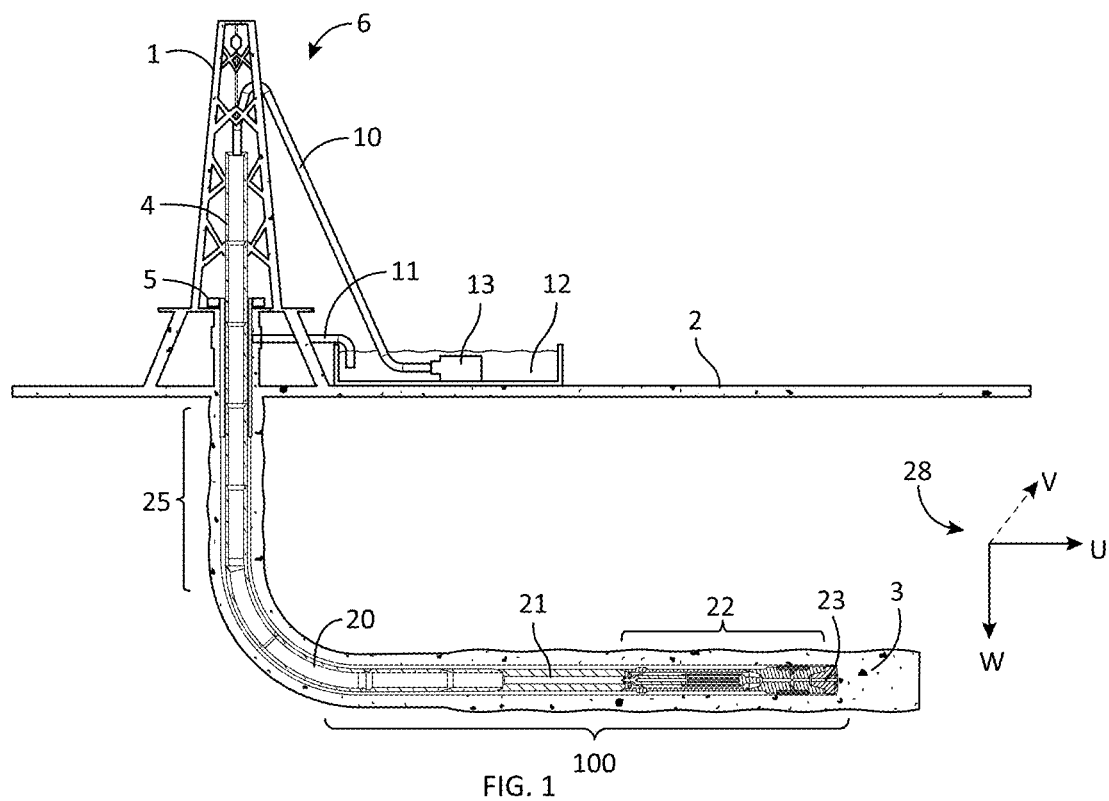
FIG. 1 is a wellbore and drilling rig cross-section view of typical drilling operation with a RSS.

FIG. 1 represents the schematic of a typical drilling operation. Above the rig floor surface 2, a drilling rig 6 may be present to drill downhole. The representation of FIG. 1 is typical for a land rig. The invention implementation may also and equally function for an offshore drilling rig. The presence of sea water below the rig floor surface 2 will not influence the function of the invention described thereafter.

Above the rig floor surface 2, a typical drilling rig 6 is represented. Among the key components, a derrick 1 will hold the rig structure including a top drive and drill pipes. Installed drill pipes are represented as item 4. Each additional drill pipe allows extending the overall drill string 20 to allow drilling inside the ground 3. The drill string 20 will typically rotate along its cylindrical axis thanks to a rotary table 5. Also represented is the surface mud circulation system. The drilling mud will typically be stored inside a mud tank 12. A mud inflow pipe 10 will provide mud inside the drill pipe 4 and inside the overall drill string 20. The mud return will occur on the annulus between the external surface of drill string and inside the drilled well bore. The mud return pipe 11 directs the mud back to the mud tank 12. The mud pump 13 provides the flow power for the mud to circulate from surface to downhole, reaching the drill bit 23 and then back to surface.

Downhole inside the ground 3, a typical drill string 20 is represented. From the furthest point of the drill string 20, a drill bit 23 is present as the boring point inside the ground 3. Above the drill bit, a Rotary Steerable System 22, further referred to as RSS, may be present, which may be followed with a Logging While Drilling system, further referred to as LWD, with a Measurement While Drilling system 21, further referred to as MWD, and with a Mud Motor, further referred to as MM. The remaining parts of the drill string 20 are constituted by an assembly of drill pipes 4, which are typically connected one by one from surface.

A typical wellbore representation is depicted in FIG. 1 with a vertical section 25 followed by a horizontal section 100. Additional wellbore configurations are also possible. For example, the horizontal section may include multiple deviated sections resulting in a wellbore having multiple turns and directions. The drill string 20 could have the possibility to follow an intended trajectory and create a wellbore based on any direction within a 3-dimensional ground coordinate system 28 with three main axis directions U-V-W, as depicted in FIG. 1. The ground coordinate system 28 may include the axis W pointing towards the earth gravity direction. The coordinate system 28 may be fixed to the ground or the subterranean formation, and independent from the drill string 20 position.

Figure 2:
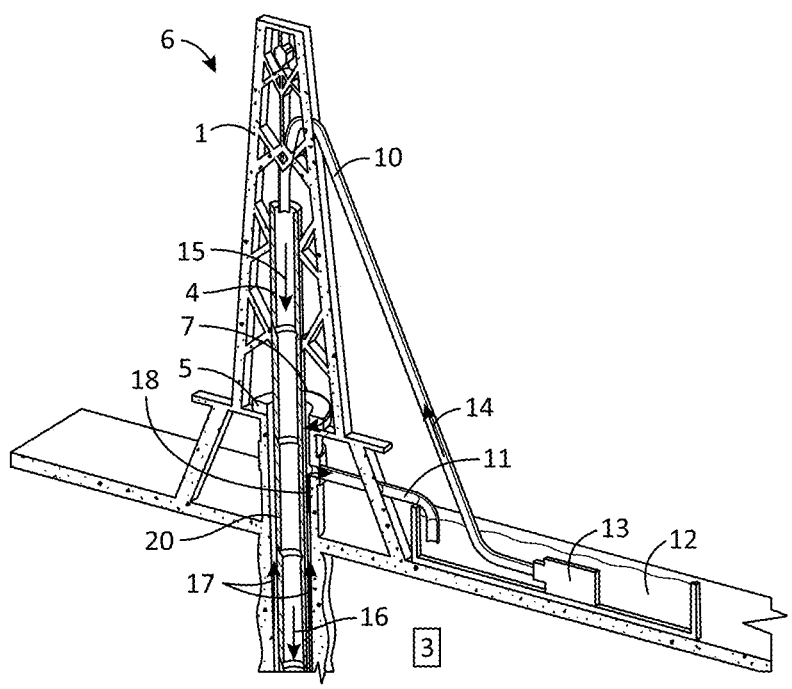
FIG. 2 is a drilling rig isometric cross-section view of the drill string movement and drilling mud circulation.

FIG. 2 represents a detailed view of the surface rig 6. The detailed view of FIG. 2 allows depicting the surface mud circulation. Surface mud circulation may influence the downhole mud circulation in the RSS, which will further be depicted in FIG. 3 to FIG. 5.

The drill string 20 is supported and directed at surface by the derrick 1, typically including a top drive above the drill string. In continuous drilling operation, additional drill pipes 4 are connected, typically screwed one-by-one, on the existing drill string 20, extending the overall drill string and offering the possibility to drill deeper in the ground 3. Generally, a rotary table 5 or a top drive contributes to a rotation movement 7 of the drilling string 20. A downhole mud motor can also be added to the drill string to provide additional rotation movement. This movement is typically clockwise, if having a view from the rig towards downhole, or W direction, based on coordinate system 28.

The mud circulation is depicted from the mud tank 12, through the mud pump 13 and towards the mud inflow pipe 10. The mud movement is represented as the arrow 14 upwards inside the mud inflow pipe 10. The mud then circulates downwards inside the drill pipes 4 and overall drill string 20, which is represented with arrows 15 and 16. The mud circulates back, as depicted with arrows 17, through the anulus between the external surface of the drill string and the wellbore. Back to surface, the mud return flow is directed out of the bell nipple towards a radial direction 18. Then the mud circulates back to the mud tank 12 through a return pipe 11.

Figure 3:
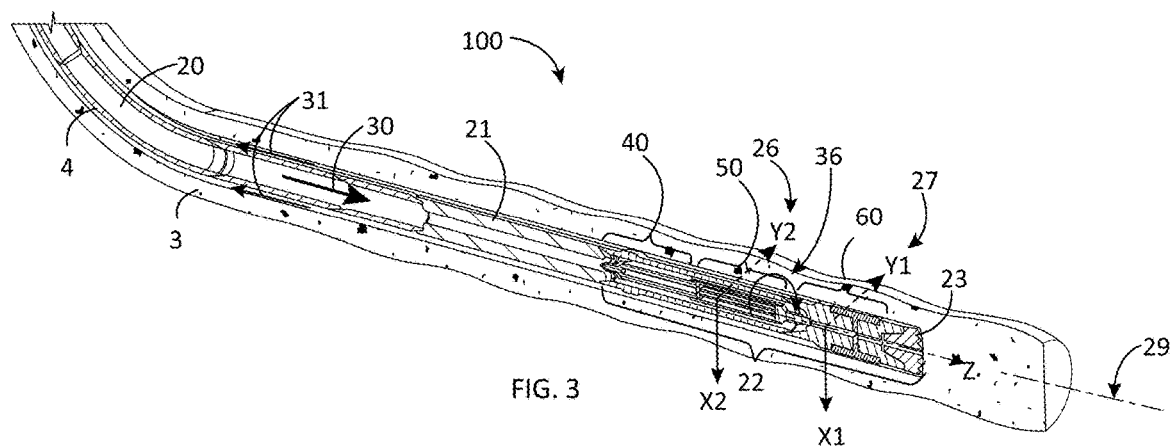
FIG. 3 is a wellbore isometric cross-section view of the end portion of the drill string including a RSS.

FIG. 3 represents a detailed view of the drilled wellbore horizontal section 100. The horizontal section 100 may include the end part of the drill string 20 within the ground 3. The drill string 20 may include a MWD system 21 and a LWD system. An RSS 22 may be connected to a LWD or MWD section 21. The RSS 22 may include an AC machine 40 powered by the mud flow, a sensor section 50, a control valve rotor 62, and a steering section 60. The steering section 60 may include piston pads which can be used to steer the drill string 20 towards the desired direction. The depicted figure represents what is commonly referred to as "push-the-bit" system. The invention further described would as well be compatible with a "point-the-bit" system. A mud flow, represented with arrow 30, would travel within the internal cylindrical cavity of the drill string 20. A return flow, represented with arrows 31, would travel in the opposite direction as mud flow 30, on the annulus between the external surface of the drill string 20 and the drilled wellbore cavity within the ground 3. Further details of mud flow within the RSS 22 will be depicted and described in FIG. 5.

Typically, a drill collar 61 will be part of the steering section 60. The drill collar 61 may be used as a reference for the drill string 20 regarding its position within the ground reference coordinate system 28. A coordinate system 27 may be attached to the drill collar 61, and therefore attached to the parts rotating with the drill collar 61. The drill collar coordinate system 27 would include a cylindrical rotation axis 29 as the rotation axis of the RSS 22, which also represents the Z-axis of the drill collar coordinate system 27. Both axis $X_1$ and $Y_1$ of the drill collar coordinate system 27 may be within the perpendicular plane related to the Z-axis and may have directions as depicted on FIG. 3.

The sensor section 50 may be attached to a coordinate system 26 which is independent from the drill collar 61. The sensor section coordinate system 26 may include the same Z-axis as the drill collar coordinate system 27. For both coordinate systems, 26 and 27, the Z-axis may represent the drilling trajectory of the RSS 22. Both axis $X_2$ and $Y_2$ of the sensor section coordinate system 26 may be within the perpendicular plane related to the Z-axis and may have directions as depicted on FIG. 3. The independent coordinate systems 26 and 27 may be an illustration of the rotation independence of the sensor section 50 relative to the drill collar 61. The rotation of the sensor section 50, around the axis Z, may be referred as to an angular rate, represented with spinning arrow 36.

Figure 4:
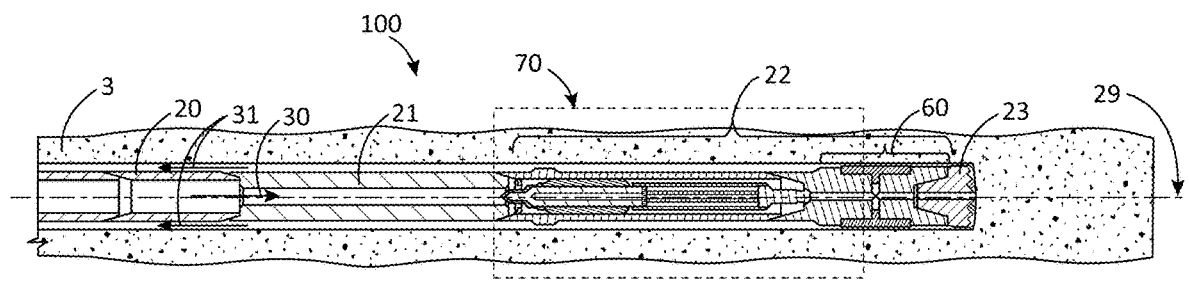
FIG. 4 is a wellbore cross-section view of the end portion of the drill string including a RSS along its rotation axis.

FIG. 4 represents a detailed view of the drilled wellbore horizontal section 100 along the cylindrical rotation axis 29. The cross-section view depicts the end portion of the drill string 20 within the ground 3. An expanded selected area 70 will further be described in FIG. 5. The selected area 70 includes the key internal components of the RSS 22. The steering section 60 is depicted at the proximity of the drill bit 23. On the opposite direction of the drill bit 23, a LWD or MWD system 21 may be present to measure, record and transmit data to the surface while drilling. The measured data may be used for controlling the RSS, be transmitted back to surface through mud pulses, or recorded for further reference after retrieval of the drill string 20 at surface.

The drilling mud typically circulates downwards inside the center cavity of the drill string 20 following a flow path 30. After passing through the LWD and MWD system 21, then through the RSS 22 and finally through the drill bit, the drilling mud circulates back upwards on the external surface of the drill string, as represented by flow path 31.

Figure 5:
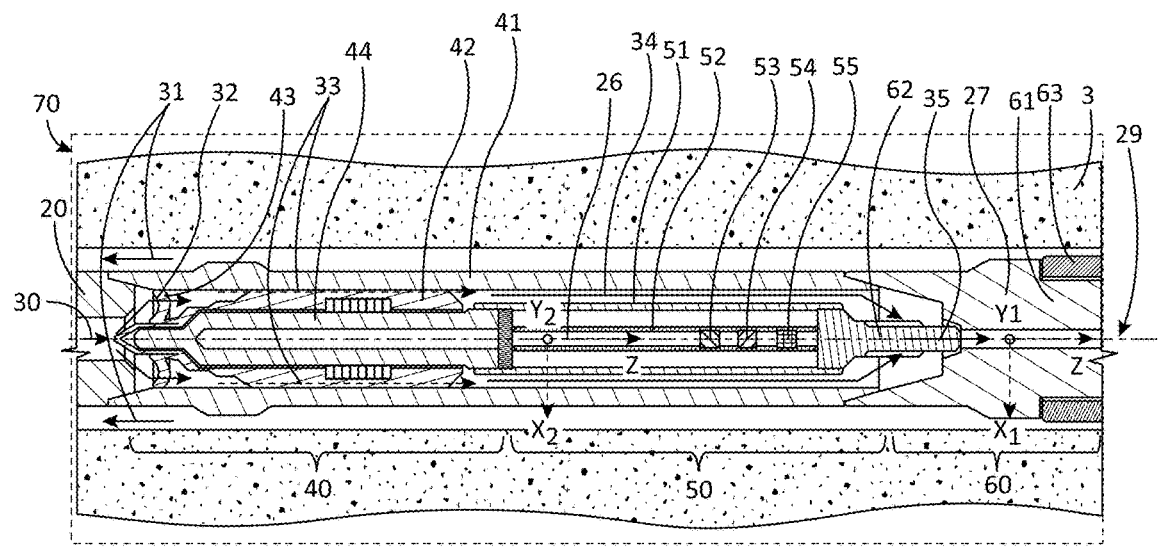
FIG. 5 is a wellbore cross-section view of a detailed portion of a RSS including mud flow paths within the different sections.

FIG. 5 represents an expanded detailed view of area 70 as defined in FIG. 4. FIG. 5 is a cross-section view of the AC machine 40, the sensor section 50, and the steering section 60 of the RSS 22, along the cylindrical rotation axis 29. The AC machine 40 of the RSS may include a stator unit 44 and a rotor unit 42. The rotor unit 42 may be mechanically linked to a turbine 43. The turbine 43 may rotate using the mud flow 32 diverted from the main mud flow 30 circulating inside the drill string 20 from surface. The AC machine 40 provides electric power and mechanical torque to the RSS 22. The control of the AC machine 40 enables the production of the torque required to set the tool face angle 205. The tool face angle 205 can be defined as the angular position of internal components of the RSS along the main cylindrical axis of the drill string 20, using the ground as reference. Such internal components may include a control valve rotor 62 and the sensor section 50. During drilling operations, the external body including the drill collar 61 of the drill string 20 may rotate, driven by a rotary table 5 or a top drive located on the surface rig 6, or by a mud motor located uphole of the RSS.

The sensor section 50 may be connected mechanically to the control valve rotor 62. The sensor section 50 may include various components able to measure, record and use data from in-situ sensors. For the claimed invention related to in-situ calibration, the in-situ sensors of the sensor section 50 will be limited to sensors sensible to rotation, such as magnetometers 53, angular rate sensors 54 and accelerometers 55. Typically, multiple magnetometers and multiple accelerometers may be present within the sensor section 50, such as three each.

The magnetometers 53 may measure the actual angular position of the sensor section 50 relative to the earth magnetic field along multiple axis, typically along the axis $X_2$, $Y_2$ and Z as displayed in the sensor section coordinate system 26 of FIG. 3 and FIG. 5. The presence of multiple magnetometers 53 within the sensor section 50 may allow to realize multiple measurements along the different axis $X_2$, $Y_2$, Z of the sensor section.

The angular rate sensor 54 may measure the angular rate Ω 36 of the sensor section 50 relative to the ground 3 as reference while rotating around the Z axis.

The accelerometers 55 may measure the angular position of the sensor section 50 relative to the earth gravity field along multiple axis, typically along the axis $X_2$, $Y_2$ and Z as displayed in the sensor section coordinate system 26 of FIG. 3 and FIG. 5. The presence of multiple accelerometers 55 within the sensor section 50 may allow to realize multiple measurements along the different axis $X_2$, $Y_2$, Z of the sensor section.

An electronic section 52 may also be included in the sensor section 50. The electronic section 52 may include the control and command system for the AC machine 40, which in turn can provide a form of control for the steerable section 60.

The control valve rotor 62 may provide directional flow to the steerable pads 63. Output flow 35 from the control valve rotor 62 may depend on the rotational orientation of the control valve rotor 62 relative to the ground 3 as reference. Depending on the rotational position of the control valve rotor 62 relative to the ground 3, the steering pads 63 may be extended radially at an angular position corresponding to the tool face angle 205, resulting in the control of the drilling direction of the drill string 20.

The in-situ calibration of the angular rate sensors 54 or the magnetometers 53 may focus on determining an offset error and a scale factor error. Other errors, such as cross sensitivity errors between the sensors along $X_2$, $Y_2$ and Z axis, may be calibrated independently in a factory lab.

As an example, an angular rate sensor equation may have the form of:

$$\Omega = \Omega o + \Omega t * (1 + \Omega s)$$

whereby Ω is the angular rate sensor rate output, $\Omega_o$ is the angular rate sensor offset error, $\Omega_t$ is the true angular rate along the rate sensor sensitive axis, $\Omega_s$ is the scale factor error, and $(1+\Omega_s)$ is the scale factor. Linearity errors and random errors may have been neglected in the angular rate sensor equation, as typically not significant for well drilling operation.

As an example, a magnetometer equation may have the form of:

$$M = Mo + Mt * (1 + Ms)$$

whereby M is the magnetometer output, $M_o$ is the magnetometer offset error, $M_t$ is the true magnetic field along the magnetometer sensitive axis, $M_s$ is the scale factor error, and $(1+M_s)$ is the scale factor. Linearity errors and random errors may have been neglected in the magnetometer equation, as typically not significant for well drilling operation.

Figure 6:
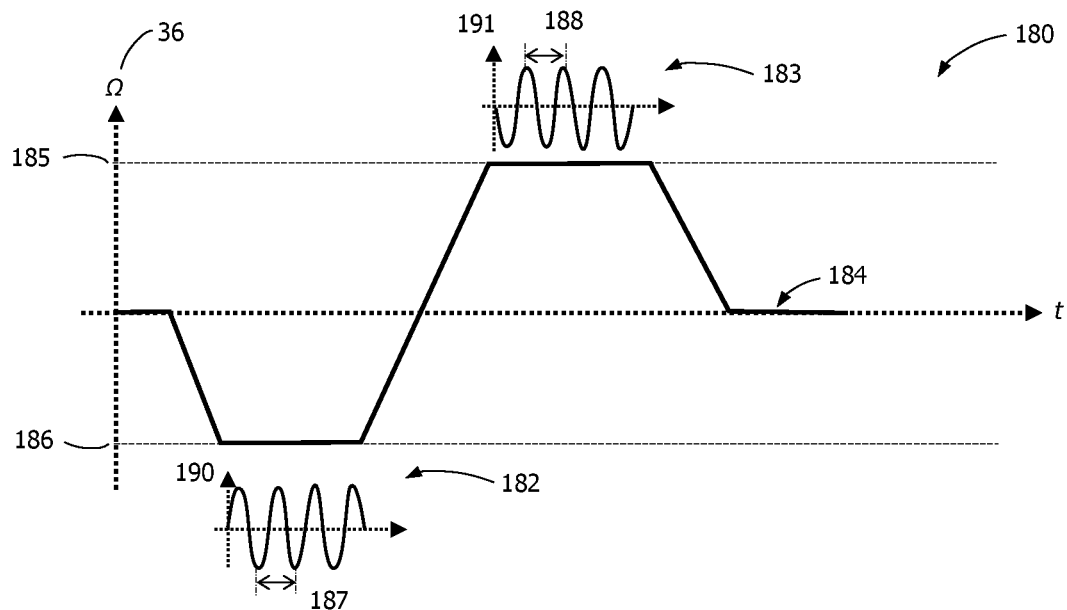
FIG. 6 is a schematic along time of tool angular rate RPM sequence defining an angular rate sensor and magnetometer calibration sequence.

FIG. 6 represents a calibration sequence over time, t as the graph abscissa, of both the angular rate sensor 54 and the magnetometers 53. The graph ordinate may represent the angular rate 36 of the sensor section 50, typically recorded in RPM or Rotation Per Minute. Three phases of calibration may be present sequentially.

A first phase 182 of the calibration may be present. During the first phase 182, the sensor section 50 may be set to rotation at a pre-determined angular rate in the counterclockwise direction, around the Z-axis, when observing the drill string from the top, as programmed in the RSS start up sequence.

During the first phase 182, the magnetometer 53 may record a signal 190 having a form of a sinusoid waveform. The sensor section 50 may perform a live analysis of the sinusoid waveform signal 190, evaluating the timing of the peaks of the waveform, and allowing to determine the period 187 of the sinusoid waveform. Using the inverse of the period 187, a frequency of the sinusoid waveform may be determined, and the frequency may be equal to the actual angular rate 36 of the sensor section 50. The actual angular rate measured from the magnetometer 53 may be compared with a target angular rate value 186, and a rate adjustment may be performed to reach an angular rate narrower to the target angular rate value 186. During the first phase 182, the raw signal of the angular rate sensor 54 may be recorded and compared with the target angular rate value 186. Also, during the first phase 182, the peak values, as minimum and maximum, of the waveform signal 190 of the magnetometer 53 may have an average value tending towards zero. The average value difference with zero may be used as the offset error $M_o$ for the calibration of the magnetometer 53.

A second phase 183 of the calibration may be present. During the second phase 183, the sensor section 50 may be set to rotation at a pre-determined angular rate as programmed in the RSS start up sequence. A target angular rate for the sensor section 50 may have a value 185, which may have the same absolute value as the target angular rate value 186, in the clockwise orientation, around the Z-axis, when observing the drill string from the top.

During the second phase 183, the magnetometer 53 may record a signal 191 having a form of a sinusoid waveform. The sensor section 50 may perform a live analysis of the sinusoid waveform signal 191, evaluating the timing of the peaks of the waveform, and allowing to determine the period 188 of the sinusoid waveform. Using the inverse of the period 188, a frequency of the sinusoid waveform may be determined, and the frequency may be equal to the actual angular rate of the drill string 20 or RSS 22. During the second phase 183, the raw signal of the angular rate sensor 54 may be recorded and compared with the target angular rate value 185.

An angular rate sensor offset error $\Omega_0$ may be calculated using the raw signal of the angular rate sensor 54 during the first phase 182 and the raw signal of the angular rate sensor 54 during the second phase 183. The sum of both raw signals, then divided by two, allows to determine the angular rate sensor offset error $\Omega_0$.

A third phase 184 of the calibration may occur after the first two phases. During the third phase 184, the angular rate 36 of the sensor section 50 may be brought to zero RPM. The signals of the magnetometers 53 may be constant and the angular rate sensor 54 may be equal to zero. The third phase 184 may allow to validate the calibration calculation done during the first phase 182 and second phase 183. If an error is detected, the full calibration sequence with first, second and third phase can be reconducted.

Figure 7:
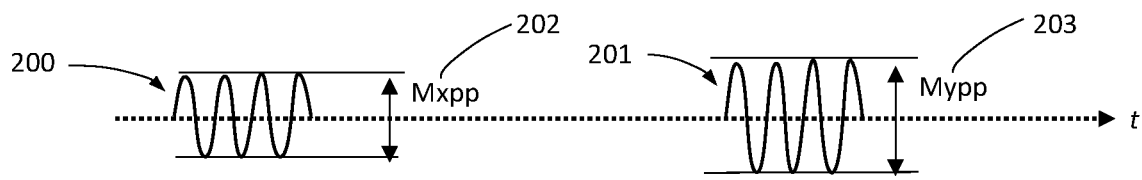
FIG. 7 is a schematic along time of magnetometers $X_2$ and $Y_2$ waveforms with peak-to-peak amplitude recording, used for scale factor equalization of the calibration of magnetometers.

FIG. 7 depicts a method to equalize the scale factors $(1+M_s)$ of the magnetometers along axis $X_2$ and $Y_2$. After completion of the calibration phases 182, 183, 184, the scale factors of magnetometers along axis $X_2$ and $Y_2$ may be equalized by comparing the peak-to-peak amplitudes of the $X_2$ and $Y_2$ magnetometers waveforms. Scale factor corrections Kx and Ky may be used to correct the measurement $M_x$, as $M_{x\_corrected}$, done along axis $X_2$, and the measurement $M_y$, as $M_{y\_corrected}$, done along axis $Y_2$, according to following equations:

$$M_{x\_corrected} = K_x * M_x$$

$$M_{y\_corrected} = K_y * M_y$$

FIG. 7 represents a waveform 200 of a magnetometer along the axis $X_2$ and a waveform 201 of a magnetometer along the axis $Y_2$. The waveform 200 may include a peak-to-peak value $M_{xpp}$ 202 while the waveform 201 may include a peak-to-peak value $M_{ypp}$ 203, as depicted in FIG. 7. The scale factor corrections $K_x$ and $K_y$ may be calculated so that the corrected $M_{xpp}$ and $M_{ypp}$ values are identical. Following equations may then be used:

$$K_x = \frac{\frac{M_{xpp} + M_{ypp}}{2}}{M_{xpp}}$$

and:

$$K_y = \frac{\frac{M_{xpp} + M_{ypp}}{2}}{M_{ypp}}$$

The corrected $M_x$ measurement, and corrected $M_y$ measurement, may further be used in the form of a ratio My/Mx to calculate the Tool Face angle, using following equation:

$$TF = \arctan\left(\frac{My}{Mx}\right) + \alpha$$

whereby $\alpha$ is the angle between the projection on the $X_2$-$Y_2$ plane of the earth gravity field and the earth magnetic field.

Figure 8:
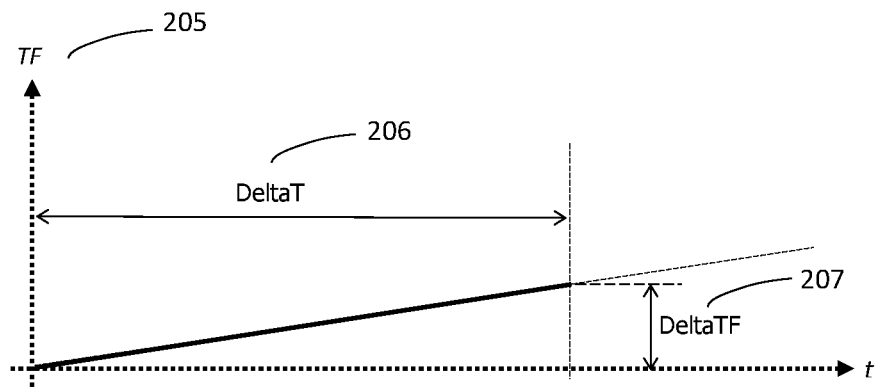
FIG. 8 is a schematic along time of tool face angle drift, used for angular rate sensor residual offset error calibration.

FIG. 8 represents a time chart recording the Tool Face angle 205, noted TF. The recording of the tool face angle may be performed after the completion of three phases calibration 181, 182, 183, and after the angular rate $\Omega$ of the sensor section has been set at 0 RPM. A residual offset error of the rate sensor may be fine-tuned for the calibration by monitoring the slow drift of the tool face angle 205, when the angular rate $\Omega$ is set at 0 RPM. The residual offset of the rate sensor may be then corrected using the variation rate of the tool face angle, as DeltaTF 207, versus time variation, as DeltaT 206. The ratio of the DeltaTF 207 over the DeltaT 206 may be used as a correction value. Following formula may be used:

$$\Omega_{corrected} = \Omega - \frac{DeltaTF}{DeltaT}$$

There may be the possibility to calibrate multiple times within in-situ operations. The frequency of downhole calibration may be adjusted based on type of operation or downhole conditions. The downhole calibration may occur once every time the RSS is powered up after a drill stand is connected and mud pumps are cycled, or at fixed time intervals or after a change in drilling conditions. Multiple calibrations within a short period of time allows improving the precision and the robustness of the electronic components, magnetometers, and angular rate sensors.

Fast iteration of calibration while operating allows coping with the wellbore environment and its adaptation. For example, the calibration can be adapted to the wellbore temperature. The wellbore temperature can quickly vary, such as several Kelvin or Celsius degree per minute, as the drill string 20 further progresses downhole. Typical temperature variations can reach a range variation of 50 to 200 degrees Kelvin or Celsius while performing drilling operation.

What is claimed is:

1. A method comprising:
calibrating sensors within a sensor section of a drilling tool,
whereby the drilling tool follows a drilling trajectory along a Z-axis,
whereby the calibration of the sensor section occurs downhole and in-situ within the drilling tool,
whereby the sensor section includes sensors sensitive to rotation along the Z-axis including one or multiple angular rate sensors, one or multiple magnetometers sensitive to magnetic fields perpendicular to the Z-axis, and, optionally, one or multiple accelerometers,
wherein the calibration includes calibrating an offset error of one angular rate sensor, comprising:
rotating the sensor section along ts Z-axis at two pre-determined angular rates and directions in two phases, independently of the rotation rate of the drilling tool, wherein the two pre-determined angular rates are rotation rates with identical absolute values and the two pre-determined directions are opposite rotation directions,
recording an actual waveform signal of the magnetometers during each of the two phases,
calculating an actual angular rate and an actual direction for each of the two phases using the actual waveform signal of the magnetometers, and
comparing the actual angular rate to the pre-determined angular rate in each of the two phases.

2. The method of claim 1, whereby the absolute value of the two pre-determined angular rates is between 5 RPM and 500 RPM.

3. The method of claim 1, further comprising correcting a residual offset error of the one or multiple angular rate sensors, including:
setting the rotation of the sensor section at 0 RPM,
monitoring a slow drift of a tool face angle versus time,
applying an additional offset correction required to cancel the slow drift.

4. The method of claim 1, further comprising:
calculating the offset error of the angular rate sensor using the actual angular rate calculated from the waveform signal of the magnetometers as the reference.

5. A method comprising:
calibrating sensors within a sensor section of a drilling tool,
whereby the drilling tool follows a drilling trajectory along a Z-axis,
whereby the calibration of the sensor section occurs downhole and in-situ within the drilling tool,
whereby the sensor section includes sensors sensitive to rotation along the Z-axis including one or multiple angular rate sensors, one or multiple magnetometers sensitive to magnetic fields perpendicular to the Z-axis, and, optionally, one or multiple accelerometers,
wherein the calibration includes calibrating an offset error of one angular rate sensor, comprising:
rotating the sensor section at a first pre-determined angular rate and direction, determining the actual first angular rate of the sensor section, using the actual waveform signal of the magnetometers as the reference, adjusting the first angular rate of the sensor section, using the magnetometer signals as the reference, recording the first angular rate of the sensor section, using the angular rate sensor, rotating the sensor section at a second pre-determined angular rate and direction, whereby the absolute value of the first and second pre-determined angular rates are identical, whereby the second pre-determined rotation direction is opposite to the first pre-determined rotation direction, determining the actual second angular rate of the sensor section, using the actual waveform signal of the magnetometer signals as the reference, adjusting the second angular rate of the sensor section, using the magnetometer signals as the reference, recording the second angular rate of the sensor section, using the angular rate sensor, summing the first angular rate and the second angular rate of the sensor section, recorded by the angular rate sensor, dividing the sum by two, and using the result as the offset error for the angular rate sensor calibration.

6. The method of claim 5, whereby the absolute value of the first and second pre-determined angular rate is between 5 RPM and 500 RPM.

7. The method of claim 5 elaim 3, further comprising correcting a residual offset error of the one or multiple angular rate sensors, including:

setting the rotation of the sensor section at 0 RPM, monitoring a slow drift of a tool face angle versus time, applying an additional offset correction required to cancel the slow drift.

8. A method comprising:

calibrating sensors within a sensor section of a drilling tool, whereby the drilling tool follows a drilling trajectory along a Z-axis, whereby the calibration of the sensor section occurs downhole and in-situ within the drilling tool, whereby the sensor section includes sensors sensitive to rotation including multiple magnetometers, wherein the calibration occurs by rotating the sensor section along its Z-axis at controlled rotation rates and controlled rotation directions, whereby at least two magnetometers are aligned towards a X-axis, referred as to a X-magnetometer, and towards a Y-axis, referred as to a Y-magnetometer, whereby the X-axis and Y-axis are positioned in a plane perpendicular to the Z-axis, to form a cartesian coordinate system X-Y-Z;

further correcting the offset errors of the X-and Y-magnetometers, comprising:

determining the minimum and the maximum values of the X-magnetometer signal, while the sensor section is rotating at a determined angular rate, around the Z-axis, determining the minimum and maximum values of the Y-magnetometer signal, while the sensor section is rotating at a determined angular rate, around the Z-axis, applying a correction to the minimum and maximum values of the X-magnetometer signal so that the sum of corrected minimum plus corrected maximum is zero, applying a correction to the minimum and m aximum values of the Y-magnetometer signal so that the sum of corrected minimum plus corrected maximum is zero.

9. The method of claim 8, further comprising equalizing the scale factors of the X- and Y-magnetometers, comprising:

rotating the sensor section at a determined angular rate and direction, recording an actual waveform signal from the X-and Y-magnetometers while the sensor section is rotating at a determined angular rate, determining the peak-to-peak amplitude of the X magnetometer signal, determining the peak-to-peak amplitude of the Y magnetometer signal, applying correction to the peak-to-peak amplitudes of the X and Y magnetometers so that the corrected values of the peak-to-peak amplitudes of the X and Y magnetometers are identical.

\* \* \* \* \*